United States Patent [19]
Bennett

[11] Patent Number: 5,674,034
[45] Date of Patent: Oct. 7, 1997

[54] LOCKING NUT ASSEMBLY

[76] Inventor: Bruce A. Bennett, 15 Chestnut Ave., San Rafael, Calif. 94901

[21] Appl. No.: 409,812

[22] Filed: Mar. 24, 1995

[51] Int. Cl.⁶ .................................................. F16B 39/10
[52] U.S. Cl. ................................................ 411/197; 411/120
[58] Field of Search ............................. 411/119, 120, 411/121, 191, 197, 924, 974

[56] References Cited

U.S. PATENT DOCUMENTS

| | | | |
|---|---|---|---|
| 922,642 | 5/1909 | Twyman | 411/120 |
| 950,071 | 2/1910 | Luckey | 411/199 |
| 970,274 | 9/1910 | Spencer | 411/197 |
| 1,199,548 | 9/1916 | Hedderwick | 411/198 |
| 1,328,443 | 1/1920 | Marburger et al. | 411/203 |
| 1,448,178 | 3/1923 | Andrix | 411/198 |
| 3,382,905 | 5/1968 | Gutshall | 411/198 |
| 3,670,795 | 6/1972 | Kupfrian | 411/191 |
| 4,734,001 | 3/1988 | Bennett | 411/120 |
| 4,737,058 | 4/1988 | Callman et al. | 411/120 |
| 4,906,150 | 3/1990 | Bennett | 411/119 |
| 5,080,544 | 1/1992 | Bruyere | 411/120 |
| 5,395,192 | 3/1995 | Bennett | 411/120 |

FOREIGN PATENT DOCUMENTS

| | | | |
|---|---|---|---|
| 442194 | 6/1949 | Italy | 411/119 |
| 57199 | 7/1924 | Sweden | 411/197 |
| 127427 | 6/1919 | United Kingdom | 411/120 |
| 371254 | 4/1932 | United Kingdom | 411/198 |

*Primary Examiner*—Flemming Saether
*Attorney, Agent, or Firm*—Flehr Hohbach Test Albritton & Herbert LLP

[57] ABSTRACT

Locking nut assembly for use on a shaft such as the bearing hub of four wheel drive vehicle. The shaft is externally threaded and has a longitudinally extending slot, with a nut threadedly mounted on the shaft. A first lock part is mounted on the shaft beneath the nut with a tab which extends into the slot to prevent rotation of the first lock part relative to the shaft. A second lock part is mounted over the nut with a noncircular opening in which the nut is received so that the nut cannot rotate relative to the second lock part. The two lock parts are locked together so that the second lock part cannot rotate relative to the first. In the disclosed embodiments, the two lock parts are locked together by a lug which extends from one part to the other.

17 Claims, 3 Drawing Sheets

LOCKING NUT ASSEMBLY

This invention pertains generally to locking fasteners and, more particularly, to an assembly for locking a nut on a shaft.

U.S. Pat. Nos. 4,734,001 and 4,906,150 describe certain techniques for preventing threaded fasteners such as nuts and bolts from working loose due to mechanical vibration. U.S. Pat. No. 5,395,192 describes a locking nut assembly which is particularly suitable for use on a bearing hub of a four wheel drive vehicle.

It is in general an object of the invention to provide a new and improved locking nut assembly for use on a shaft.

Another object of the invention is to provide an assembly of the above character which overcomes the limitations and disadvantages of nut locking techniques heretofore employed.

These and other objects are achieved in accordance with the invention by providing an externally threaded shaft having a longitudinally extending slot, a nut having a body of noncircular peripheral contour threadedly mounted on the shaft, a first lock part mounted on the shaft beneath the nut and having a tab which extends into the slot to prevent rotation of the first lock part relative to the shaft, a second lock part having a noncircular opening in which the nut is received so that the nut cannot rotate relative to the second lock part, means locking the first and second lock parts together so that the second lock part cannot rotate relative to the first, and means for retaining the second lock part on the nut.

Figure 1:
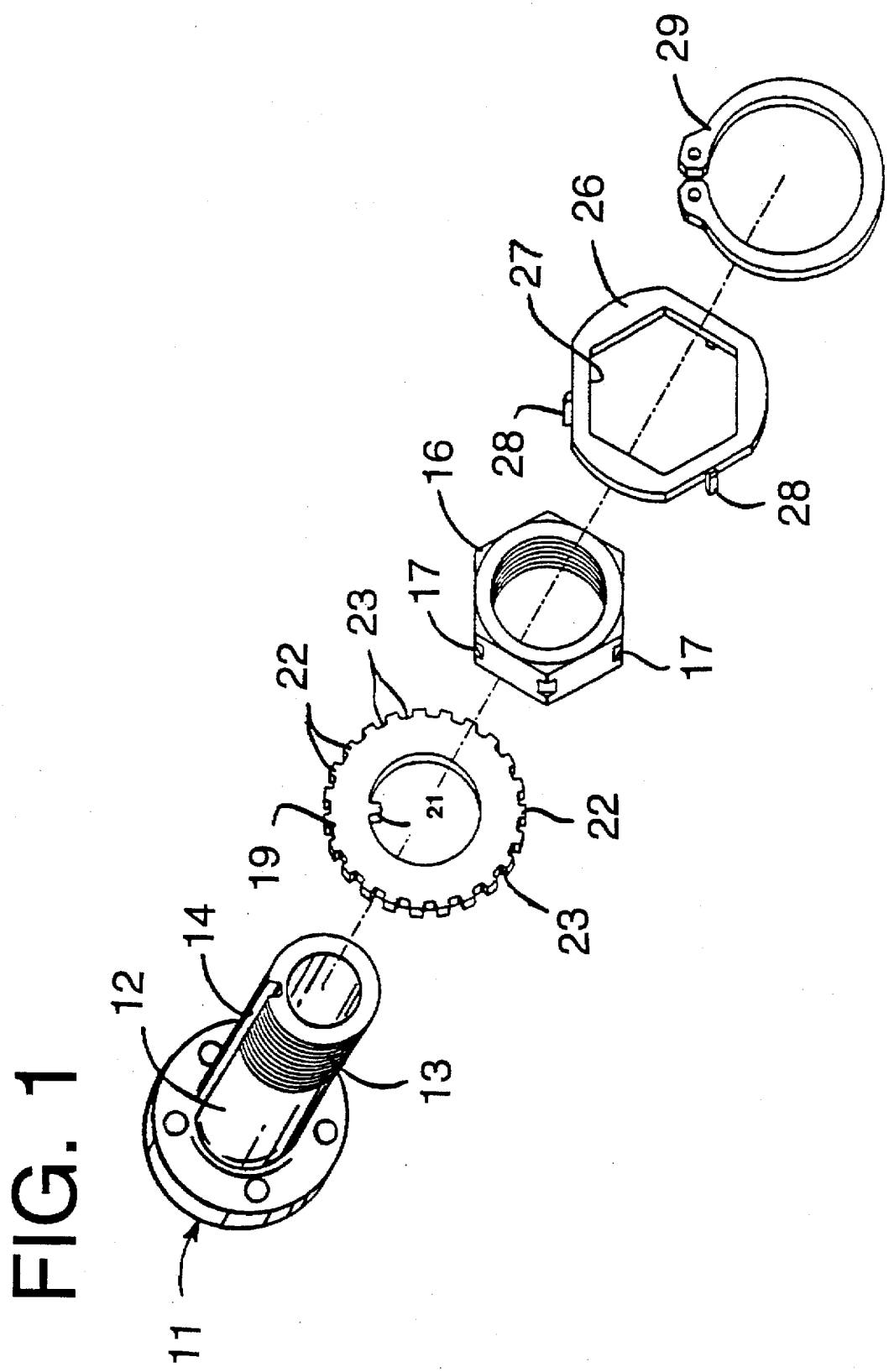
FIG. 1 is an exploded isometric view of one embodiment of a locking nut assembly according to the invention.

In the embodiment of FIG. 1, the invention is illustrated in conjunction with a bearing hub 11 for the front wheel of a four wheel drive vehicle. This hub has a generally cylindrical surface 12 on which the bearings (not shown) are mounted, an externally threaded outer portion 13 and a longitudinally extending slot 14 of generally rectangular cross-section.

A nut 16 is mounted on the threaded portion for retaining the bearings on the hub. This nut has a multi-sided body, with notches 17 formed in the corner portions thereof. In the embodiment illustrated, the nut is shown as a conventional hex nut with six flats or sides, but it can have any number of sides or noncircular shape desired. The corner notches can either be in the form of individual notches in the corners of the nut, as shown, or it can be in the form of a slot which opens through all or part of the flat surfaces between the corners as well.

An annular lock plate 19 is mounted on the hub beneath the nut and has an inwardly projecting radial tab 21 which extends into the slot in the hub and prevents rotation of the lock plate relative to the hub. The lock plate has a plurality of external teeth 22 with notches or openings 23 between the teeth. The openings are arranged in a circular or circumferential pattern and open through the outer periphery of the plate.

A lock ring or retainer 26 is mounted over the nut, with an opening 27 in which the nut is received. Opening 27 has a noncircular contour corresponding to the that of the nut (e.g., hexagonal) whereby the nut is prevented from rotating within the retainer. The retainer also has a plurality of axially extending fingers or lugs 28 which interfit with the openings 23 in the lock plate to lock two parts together and thereby prevent rotation of the retainer relative to the plate.

The lock ring or retainer is retained on the nut by a retaining ring 29 which in the embodiment illustrated is a snap ring. This ring is mounted peripherally of the nut and is received in the notches 17 in the corners of the nut. It engages the outer surface of the lock ring to keep it on the nut.

Operation and use of the embodiment of FIG. 1 is as follows. Lock plate 19 is placed on hub with tab 21 in slot 14, and nut 16 is tightened down against the lock plate. Lock ring 29 is then slipped over the nut, with lugs 28 extending into three of the openings 23 in the lock plate. Retaining ring 29 is then snapped into the notches 17 in the nut to hold the lock ring in place on the nut.

In the embodiment shown, twenty-three openings are provided in the lock plate, and three lugs are provided on the retainer. This particular combination has been found to be particularly useful since with a hexagonal nut, the retainer can be placed on the nut with any one of six different orientations and in each of those orientations can be locked in any one of twenty-three different positions relative to the hub. This provides an almost infinite variety of positions in which the nut can be locked.

The retainer is illustrated as having three fingers or lugs for engagement with the openings in the lock plate. The openings are spaced equally apart, and with twenty-three openings, the lugs are spaced seven, seven and six openings apart. Using a plurality of lugs has the advantage of permitting a greater number of smaller openings to be utilized in the lock plate without sacrificing strength in the lugs. With just one lug, for example, the lug would have to be wider, and the openings would have to be larger, which means that there could be fewer openings and fewer positions in which the nut could be locked.

While twenty-three openings and three lugs are a presently preferred combination, any desired number of openings and lugs can be provided. A preferred number of openings is preferably a prime number greater than twenty, and the preferred number of lugs is the smallest number which will provide the necessary strength given the number of openings and the size of the lugs.

Although the embodiment of FIG. 1 has been described with specific reference to the front bearing hub of a four wheel drive vehicle, it is not limited to that particular application and can be employed as well for retaining nuts on other types of shafts and other threaded parts with keyways or slots.

Figure 2:
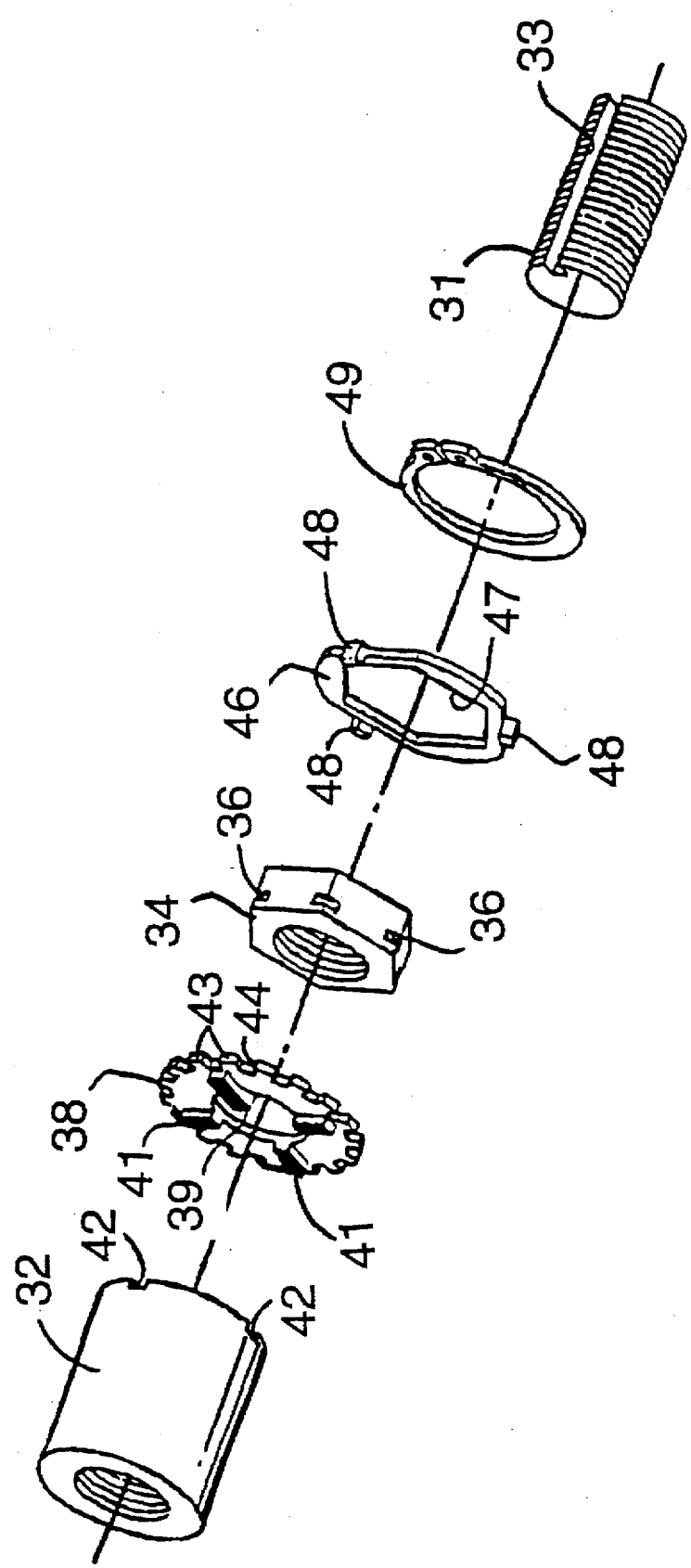
FIG. 2 is an exploded isometric view of another embodiment of a locking nut assembly according to the invention.

FIG. 2 illustrates an embodiment similar to that of FIG. 1 in which an externally threaded shaft 31 is locked to an internally threaded sleeve 32. As in the previous embodiments, the shaft has a longitudinally extending keyway slot 33 of generally rectangular cross-section.

The shaft is threaded into the sleeve and locked in position by a nut 34 having a multi-sided body and notches 36 formed in the corners of the body.

An annular lock plate 38 is mounted on the shaft between the nut and the sleeve and has an inwardly projecting radial tab 38 which extends into the slot in the shaft and prevents rotation of the lock plate relative to the shaft. The lock plate also has a plurality of radially extending, axially projecting lugs 41 on one face thereof which are received in radially extending slots 42 in the end face of the sleeve to prevent rotation of the plate relative to the sleeve. When the nut is tightened against the plate, the shaft and the sleeve are locked rigidly together. As in the embodiment of FIG. 1, the lock plate has a plurality of external teeth 43 between which notches or openings 44 are formed.

A lock ring or retainer 46 similar to lock ring 26 is mounted over the nut, and has a noncircular (e.g., hexagonal) opening 47 in which the nut is received. Lock ring 46 also has a plurality of axially extending fingers or lugs 48 which interfit with the openings 44 in the lock plate to lock two parts together and thereby prevent rotation of the lock ring relative to the plate.

The lock ring or retainer is retained on the nut by a snap ring retainer 49 similar to snap ring 29. As in the embodiment of FIG. 1, the snap ring engages the outer surface or face of the lock ring to keep the lock ring on the nut.

In use, shaft 31 is threaded into sleeve 32, and nut 34 is tightened against the sleeve, with lock plate 38 positioned between the nut and the sleeve. Lock ring 46 is then positioned over the nut, with lugs 48 extending into notches 44 to prevent rotation of the nut, and snap ring 49 is snapped onto the nut to keep the lock ring in place. With the nut tightened against the lock plate and sleeve, the shaft and sleeve are locked securely together, with tab 39 preventing the lock plate from rotating relative to the shaft, lugs 48 preventing the plate from turning relative to the sleeve, lock ring 46 preventing the nut from turning relative to the lock plate, and snap ring 49 keeping the lock ring on the nut.

With the embodiment of FIG. 2, two shafts threaded into opposite ends of sleeve 32 can be coupled rigidly together. This embodiment is useful in a wide variety of applications, such as coupling a shaft to a hydraulic cylinder or locking the parts of a turnbuckle in a desired position.

Figure 3:
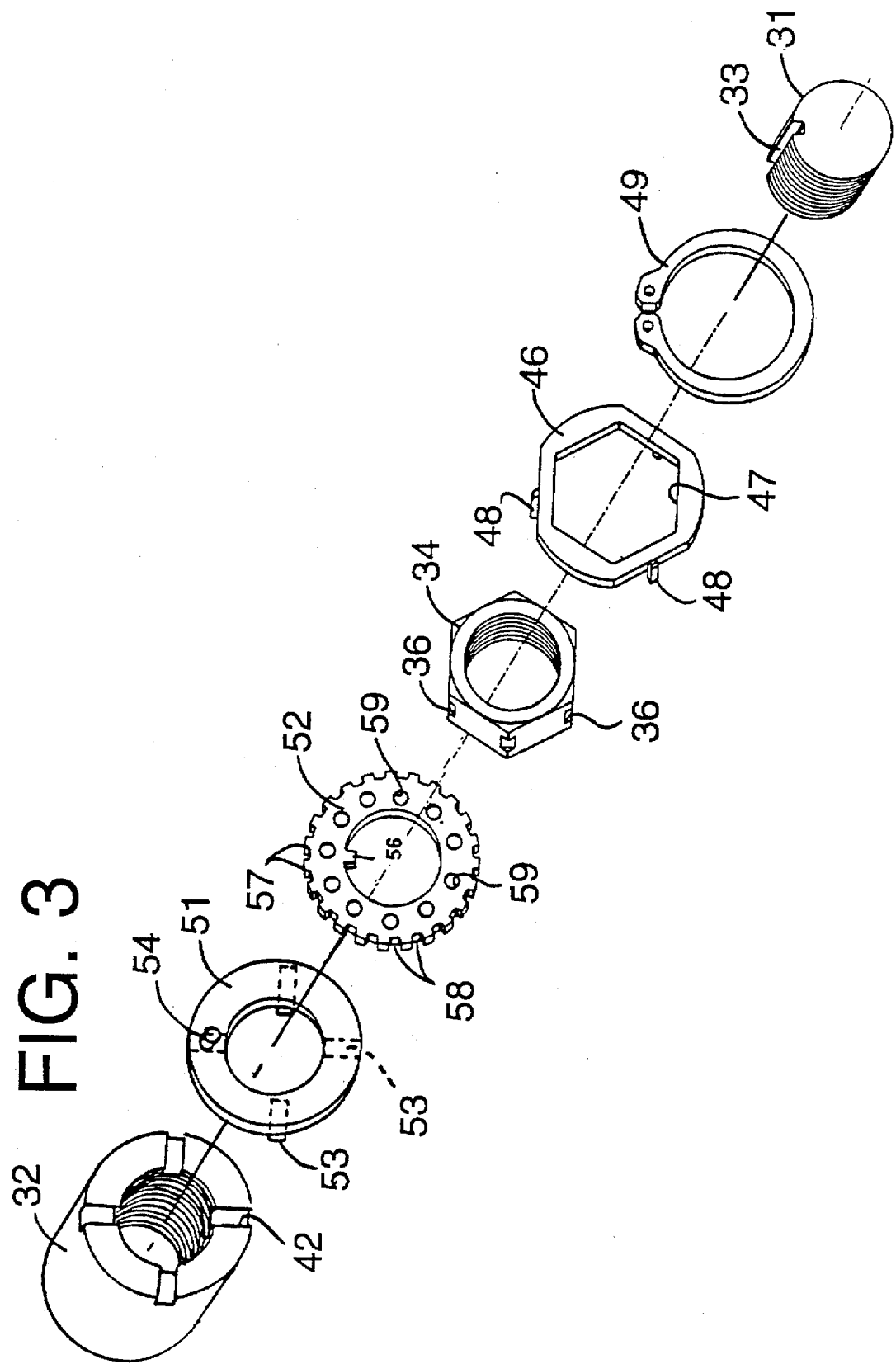
FIG. 3 is an exploded isometric view of another embodiment of a locking nut assembly according to the invention.

The embodiment of FIG. 3 is generally similar to the embodiment of FIG. 2, and like reference numerals designate corresponding elements in the two. The embodiment of FIG. 3 differs from the earlier embodiment, however, in that it has a pair of lock plates 51, 52 instead of the single lock plate 38 of the FIG. 2 embodiment.

Lock plate 51 is an annular plate with no keyway tab so that it can be turned to any rotational position desired relative to the shaft. It has a plurality of axially projecting lugs 53 similar to lugs 41 on one face thereof for engagement with the slots 42 in the in the end face of sleeve 32 to prevent rotation of the plate relative to the sleeve. The embodiment illustrated has four lugs and four slots, which permits the plate to be oriented in any one of four rotational positions relative to the sleeve, but any desired number of lugs and slots can be employed. Lock plate 51 also has a locating pin 54 which extends in an axial direction from the face of the plate opposite the lugs.

Lock plate 52 is a generally annular plate which has an inwardly projecting radial tab 56 which extends into the slot in the shaft and prevents rotation of the lock plate relative to the shaft. This plate has a plurality of peripheral teeth 57 and notches 56, similar to teeth 43 and notches 44, for receiving the lugs 48 of lock ring 46. Plate 52 also has a ring of spaced apart openings 59 for receiving the locating pin 54 on lock plate 51 to lock the two plates together. The number openings is preferably a prime number, and in the embodiment illustrated, eleven such openings are shown. This enables the two plates to be locked in any one of eleven different rotational positions relative to each other. If desired, a greater number of such openings can be provided, e.g. 17, 23 or 29 openings, with the degree of possible adjustment between the shaft and the sleeve increasing with the number of openings.

In use, shaft 31 is threaded into sleeve 32, and nut 34 is tightened against the sleeve, with lock plates 51, 52 between the nut and sleeve. The lugs 53 on lock plate 51 engage the slots 42 in the sleeve, and the locating pin 54 on that plate engages one of the openings 59 in lock plate 52. Lock ring 46 is then positioned over the nut, with lugs 48 extending into notches 58 on lock plate 52, and snap ring 49 is snapped onto the nut to keep the lock ring in place. With the nut tightened against the lock plates and sleeve, the shaft and sleeve are locked securely together, with tab 56 preventing the lock plate 52 from rotating relative to the shaft, locating pin 54 locking the two lock plates together, lugs 53 preventing lock plate 51 from turning relative to the sleeve, lock ring 46 preventing the nut from turning relative to the lock plates, and snap ring 49 keeping the lock ring on the nut.

As noted above, in the embodiment of FIG. 3, lock plate 51 can be locked in any one of four positions relative to sleeve 32, lock plate 52 can be locked in any one of eleven positions relative to lock plate 51, and lock ring 46 can be placed in any one of 23 different positions relative to lock plate 52 and two different positions relative to nut 34. With all of these possible positions, the nut can be adjusted in increments of less than 0.2° relative to the shaft, which is a very fine degree of adjustment.

It is apparent from the foregoing that a new and improved locking nut assembly has been provided. While only certain presently preferred embodiments have been described in detail, as will be apparent to those familiar with the art, certain changes and modifications can be made without departing from the scope of the invention as defined by the following claims.

I claim:

1. In a locking nut assembly for use on an externally threaded shaft having a longitudinally extending slot: an annular lock plate having an inwardly projecting tab adapted to extend into the slot in the shaft and a plurality of openings spaced along a circular path centered about the shaft, the number of openings being a prime number greater than 20, a nut having a body of noncircular peripheral contour adapted to be threadedly mounted on the shaft, a lock ring having a noncircular opening in which the nut is received, a lug extending from the lock ring into one of the openings in the lock plate to prevent rotation of the lock ring and the nut relative to the lock plate, and means for retaining the lock ring on the nut.

2. The assembly of claim 1 wherein the nut has a peripheral groove, and the means for retaining the lock ring on the nut comprises a retaining ring disposed in part in the groove.

3. The assembly of claim 1 wherein the shaft is a hub of a four wheel drive vehicle.

4. The assembly of claim 1 together with an internally threaded sleeve adapted to be mounted on the shaft with the lock plate positioned between the nut and the sleeve, a notch formed in the sleeve, and a lug projecting from the lock plate into the notch to prevent relative rotation of the lock plate and the sleeve.

5. In a shaft and locking nut assembly: an externally threaded shaft having a longitudinally extending slot, a nut having a body of noncircular peripheral contour threadedly mounted on the shaft, a first lock part mounted on the shaft beneath the nut and having a tab which extends into the slot to prevent rotation of the first lock part relative to the shaft, a second lock part having a noncircular opening in which the nut is received so that the nut cannot rotate relative to the second lock part, means comprising a plurality of openings spaced along a circular path on one of the lock parts and a lug affixed to the other lack part extending into one of the openings for locking the first and second lock parts together so that the second lock part cannot rotate relative to the first, the number of openings in the one lock part being a prime number greater than 20, and means for retaining the second lock part on the nut.

6. The assembly of claim 5 wherein the lug is one of a plurality of lugs which are spaced apart by a distance corresponding to the spacing of the openings in the one lock part.

7. The assembly of claim 5 wherein peripheral contour of the nut and the opening in the second lock part are hexagonal.

8. The assembly of claim 5 wherein the shaft is a hub of a four wheel drive vehicle.

9. The assembly of claim 5 together with an internally threaded sleeve mounted on the shaft with the first lock part positioned between the nut and the sleeve, a notch formed in the sleeve, and a lug projecting from the first lock part into the notch to prevent relative rotation of the lock part and the sleeve.

10. The assembly of claim 5 together with an internally threaded sleeve mounted on the shaft with the first lock part and a third lock part positioned between the nut and the sleeve, a notch formed in the sleeve, a lug projecting from the third lock into the notch to prevent relative rotation of the third lock part and the sleeve, and means on the first and third lock parts for selectively locking those two parts together in a plurality of different rotational positions relative to each other.

11. In a shaft and locking nut assembly: an externally threaded shaft having a longitudinally extending slot, an annular lock plate having an inwardly projecting tab which extends into the slot in the shaft and twenty-three equally spaced openings arranged in a circular pattern centered about the shaft, a nut having a noncircular body threadedly mounted on the shaft, a lock ring having a noncircular opening in which the nut is received, lugs extending from the lock ring into three of the openings in the lock plate to prevent rotation of the lock ring and the nut relative to the lock plate, and means for retaining the lock ring on the nut.

12. The assembly of claim 11 wherein the shaft is a hub of a four wheel drive vehicle.

13. The assembly of claim 11 together with an internally threaded sleeve adapted to be mounted on the shaft with the lock plate positioned between the nut and the sleeve, a notch formed in the sleeve, and a lug projecting from the lock plate into the notch to prevent relative rotation of the lock plate and the sleeve.

14. In a shaft and nut assembly:

an externally threaded shaft having a longitudinally extending slot;

an internally threaded sleeve mounted on the shaft and having a plurality of radially extending notches formed in an axial face thereof;

an annular lock plate having an inwardly projecting tab which extends into the slot in the shaft and prevents relative rotation of the plate and the shaft, a plurality of axially projecting lugs which extend into the notches in the face of sleeve and prevent relative rotation of the plate and the sleeve, and a plurality of openings spaced circumferentially about the shaft, the number of of openings being a prime number greater than twenty;

a nut having a body of noncircular peripheral contour threadedly mounted on the shaft on the side of the lock plate opposite the sleeve;

a lock ring having a noncircular opening in which the nut is received, and a lug extending from the lock ring into one of the openings in the lock plate to prevent rotation of the lock ring and the nut relative to the lock plate;

and means for retaining the lock ring on the nut.

15. The assembly of claim 14 wherein the openings are formed between a plurality of circumferentially spaced, radially extending teeth at the outer periphery of the lock plate.

16. In a shaft and nut assembly:

an externally threaded shaft having a longitudinally extending slot;

an internally threaded sleeve mounted on the shaft and having a plurality of radially extending notches formed in an axial face thereof;

a first lock plate having a plurality of axially projecting lugs which extend into the notches in the face of sleeve and prevent relative rotation of the plate and the sleeve;

an second lock plate having an inwardly projecting tab which extends into the slot in the shaft and prevents relative rotation of the plate and the shaft, and a plurality of openings spaced along a circular path centered about the shaft, the number of openings being a prime number greater than twenty;

means for selectively locking the first and second lock plates in a plurality of different rotational positions relative to each other;

a nut having a body of noncircular peripheral contour threadedly mounted on the shaft with the lock plates positioned between the nut and the sleeve;

a lock ring having a noncircular opening in which the nut is received, and a lug extending from the lock ring into one of the openings in the second lock plate to prevent rotation of the lock ring and the nut relative to the lock plate;

and means for retaining the lock ring on the nut.

17. The shaft and nut assembly of claim 16 wherein the means for locking the lock plates in different positions includes a pin which extends in an axial direction from one of the lock plates and is received in one of a plurality of openings spaced along a circular path in the other lock plate.

* * * * *